A. HOCHBERG.
DRAIN PIPE REAMER.
APPLICATION FILED JULY 27, 1916.

1,221,734.

Patented Apr. 3, 1917.

WITNESSES
W. May. Duvall.
H. H. Babcock.

INVENTOR
Anthony Hochberg,
BY Richard B. Owen.
ATTORNEY

UNITED STATES PATENT OFFICE.

ANTHONY HOCHBERG, OF WILKES-BARRE, PENNSYLVANIA.

DRAIN-PIPE REAMER.

1,221,734.       Specification of Letters Patent.       Patented Apr. 3, 1917.

Application filed July 27, 1916. Serial No. 111,703.

*To all whom it may concern:*

Be it known that I, ANTHONY HOCHBERG, a citizen of the United States, residing at Wilkes-Barre, in the county of Luzerne and State of Pennsylvania, have invented certain new and useful Improvements in Drain-Pipe Reamers, of which the following is a specification.

My invention relates to drain pipe reamers and more particularly to a reamer or tool especially adapted for use in removing obstructions from drain pipes and pipes used for similar purposes.

Great difficulty is often caused in connection with drainage and sewerage systems due to the pipes becoming stopped by roots of trees which force their way between the pipe joints and form obstructions through the pipes which eventually entirely close the pipe, or seriously interfere with the flow of drainage through the same. One of the main objects of my invention is to provide a tool which will quickly ream out these obstructions. A further object is to provide a tool of simple construction and operation so designed as to be easily used in a pipe of standard construction. Further objects will appear from the detailed description.

In the drawings:—

Figure 1:
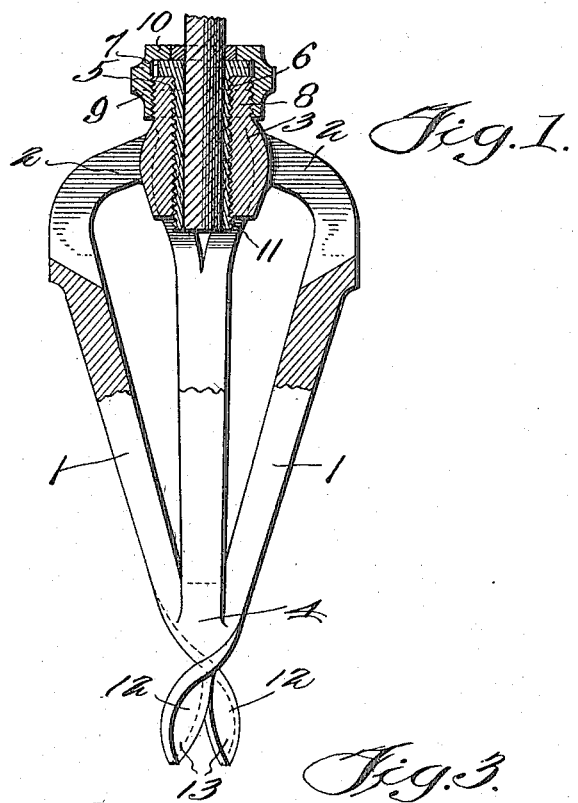
Figure 1 is a front view of the invention partly in section.
Figure 2:
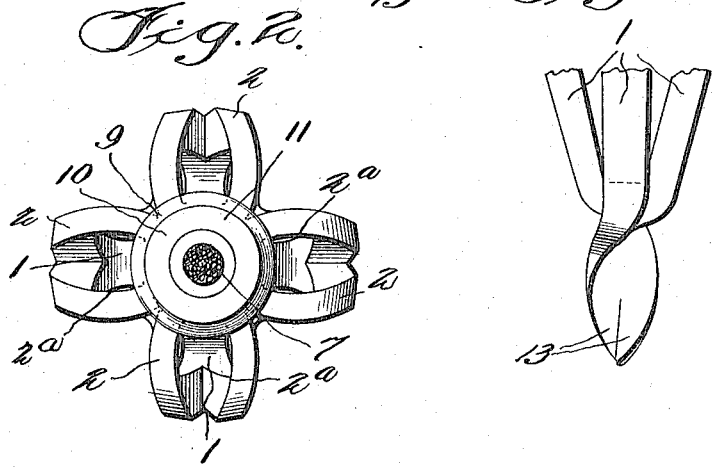
Fig. 2 is a top plan view.
Figure 3:
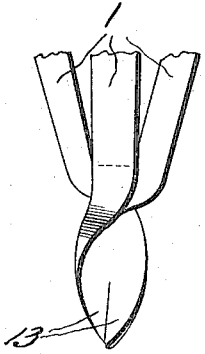
Fig. 3 is a fragmentary side view of the cutting point.

The tool has its body of tapered pear shape and is formed of a plurality of outwardly inclined arms 1 each provided with an inwardly curved upper portion or elbow 2 formed integrally with the hub 3, the lower ends of the arms being integrally connected as at 4. Each of the arms tapers in width from its lower to its upper end and the elbow 2 is provided with a central slot 2ª.

The hub 3 is provided with a central bore 5. This bore is threaded to receive a flanged tube 6 provided with an exterior left hand thread. This tube is threaded tightly into the hub so as to bring its flange 7 tightly against the upper surface thereof. The upper neck portion 8 of the hub 3 is threaded to receive a coupling nut 9 provided with a right hand thread. This nut is provided at its upper end with an inner angular flange 10 which fits above and tightly against the flange 7 of the sleeve 6. A cable 11 is firmly secured in the tube 6 and the coupling nut 9 by riveting, soldering or other suitable means. By this construction the tool may be rotated in either direction by means of the cable without danger of the cable becoming loosened therefrom.

At the lower end of the arm 1, and integral with the block like portion 4 joining the lower ends of the same, is provided a cutting point. This point consists of two oppositely disposed blades 12 of more or less convolute form. These blades coöperate to form a digging and cutting point 13; the cutting surface of each blade is so inclined that, when the tool is rotated to the right, they will act to draw it forward into the obstruction being removed. In other words, the cutting point will operate in the same manner as the cutting point of an auger. As the material is cut away it will be fed forward over portion 4 of the tool and into the space between the arms 1. As the material accumulates in the interior of the tool between the arms it will be fed outward through the slots 2ª and the spaces between the elbows 2 of the arms so as to not interfere with the advancement of the tool.

By connecting the cable in the manner described all danger of its working loose from the tool is eliminated, as previously stated. In addition, this connection renders it possible to use a flexible rotating or operating element so that the tool can be used in curved pipes as well as straight pipes. In this connection the size and length of the tool will depend to a great extent upon the angle of curvature of the particular pipe in which the tool is used, if it is used in a curved or bent pipe. If used in a straight pipe the only point necessary to consider would be the diameter of the pipe.

What I claim is:—

In a tool of the character described, the combination of a body having a plurality of outwardly inclined arms integrally connected at their inner ends, and a hub secured to the outer ends of the arms and provided with a threaded bore, said hub being further provided with a neck portion threaded oppositely to the said bore; a flanged sleeve threaded into the bore of said hub; a coupling nut threaded on the neck portion of the hub and having a flange engaging the flange of said sleeve; a cable secured in the sleeve and nut; and a plurality of oppositely disposed cutting and boring blades mounted at the apex of said body.

In testimony whereof I affix my signature in presence of two witnesses.

ANTHONY HOCHBERG.

Witnesses:
  M. PETZ,
  EDWARD N. NOLL.

Copies of this patent may be obtained for five cents each, by addressing the "Commissioner of Patents, Washington, D. C."